United States Patent
Itoh et al.

(10) Patent No.: US 6,520,888 B1
(45) Date of Patent: Feb. 18, 2003

(54) LOADING CAM APPARATUS FOR TOROIDAL TYPE CONTINUOUSLY VARIABLE TRANSMISSION

(75) Inventors: Hiroyuki Itoh, Kanagawa (JP); Kiyoshi Okubo, Gunma (JP); Nobuo Goto, Kanagawa (JP); Makoto Fujinami, Kanagawa (JP); Hiroshi Kato, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/419,116

(22) Filed: Oct. 15, 1999

(51) Int. Cl.⁷ ............................................. F16H 15/38
(52) U.S. Cl. ........................... 476/41; 476/40; 384/623
(58) Field of Search ................... 476/41, 40; 192/93 A; 384/623, 625, 573, 572; 148/906, 317, 318, 218

(56) References Cited

U.S. PATENT DOCUMENTS

| | | | |
|---|---|---|---|
| 5,084,116 A | * 1/1992 | Mitamura | 148/318 |
| 5,352,303 A | * 10/1994 | Murakami et al. | 148/318 |
| 5,379,661 A | 1/1995 | Nakano et al. | |
| 5,571,341 A | * 11/1996 | Jackel | 148/218 |
| 5,660,647 A | * 8/1997 | Mitamura et al. | 148/319 |
| 5,826,988 A | * 10/1998 | Furukawa et al. | 384/572 |
| 5,916,512 A | * 6/1999 | Arutyunov et al. | 266/47 |
| 6,132,102 A | * 10/2000 | Bessone et al. | 384/576 |

FOREIGN PATENT DOCUMENTS

| | | | |
|---|---|---|---|
| JP | 1-299358 | | 12/1989 |
| JP | 5-3714 | | 1/1993 |
| JP | 5-39830 A | * | 2/1993 |
| JP | 5-75551 | | 10/1993 |
| JP | 6-14602 | | 2/1994 |
| JP | 8-200463 | | 8/1996 |
| JP | 9-291999 | * | 11/1997 |
| JP | 11-6550 | | 1/1999 |

* cited by examiner

Primary Examiner—William C Joyce
(74) Attorney, Agent, or Firm—Sughrue Mion, PLLC

(57) ABSTRACT

A loading cam apparatus for a toroidal type continuously variable transmission includes: a first cam surface formed to have concave and convex portions thereon along a circumferential direction thereo, a second cam surface formed to have concave and convex portions thereon along a circumferential direction thereof and to oppose to the first cam surface along an axial direction thereof, a plurality of rolling elements sandwiched between the first cam surface and the second cam surface, and a retainer for holding the plurality of rolling elements in a freely rotatable state. The retainer includes a retainer main body of a circular annular shape, and pockets provided at outer periphery portions of the retainer main body for holding the plurality of rolling elements, respectively. The retainer main body is formed by carbonitriding material of iron system with a carbon concentration in a range from 0.02 to 0.20 wt % both inclusive.

10 Claims, 11 Drawing Sheets

(b)

(a)

LOADING CAM APPARATUS FOR TOROIDAL TYPE CONTINUOUSLY VARIABLE TRANSMISSION

BACKGROUND OF THE INVENTION

The present invention relates to a loading cam apparatus incorporated in a toroidal type continuously variable transmission used as a transmission for an automobile, for example.

Toroidal type continuously variable transmission of a double cavity type used as a transmission for an automobile, for example, is configured as shown in FIG. 14. As shown in the figure, the toroidal type continuously variable transmission is provided with an input shaft 1 coupled to a driving source such as an engine or the like. The input shaft 1 is provided with a loading cam apparatus 2 so that the driving force is transmitted to a variator 3 through the loading cam apparatus 2. The variator 3 is provided with a driving force transmission shaft 4 which rotates and is interlocked with the loading cam apparatus 2 and the driving force transmission shaft 4 is provided with a pair of input disks 5a, 5b disposed so as to oppose each other. A pair of output disks 6a, 6b are coaxially disposed between the pair of the input disks 5a and 5b in a loosely fitted state with respect to the driving force transmission shaft 4 so that the output disks 6a and 6b rotate synchronously.

A plurality of power rollers 7 are provided between the input disks 5a, 5b and the output disks 6a, 6b so that the rollers roll in contact with the disks swangably. The output disks 6a, 6b are interlocked to each other through a loosely fitting shaft 8 which is loosely fitted to the driving force transmission shaft 4.

The variator 3 is arranged in a manner that the rotation driving force transmitted to the driving force transmission shaft 4 is further transmitted to the loosely fitting shaft 8 through the input disks 5a, 5b, the power rollers 7 and the output disks 6a, 6b, wherein a speed ratio, that is, a value obtained by dividing the rotation speed of the output disks 6a, 6b by the rotation speed of the input disks 5a, 5b is determined by the swing angle of the power rollers 7. In other words, the speed ratio is determined by a tilt angle of the displacement shafts rotatably supporting the ends of the power rollers 7.

To be more concrete, when the power rollers 7 lie along the level or horizontal direction in parallel to the driving force transmission shaft, the transmission is in a neutral state with the speed ratio of 1. When the output disks 6a, 6b sides of the power rollers 7 incline to the direction away from the driving force transmission shaft 4, the speed ratio decreases in accordance with the inclined angle. In contrast, when the output disks 6a, 6b sides of the power rollers 7 incline toward the driving force transmission shaft 4, the speed ratio increases in accordance with the inclined angle. A first gear 9 is fitted into the loosely fitting shaft 8 and further engages with a second gear 11 provided at a counter shaft 10.

The loading cam apparatus 2 is arranged to include a first cam surface 13 formed to have concave and convex portions thereon along a circumferential direction of one side surface of a loading cam 12 which engages with the input shaft 1 and rotates together with the input shaft 1, a second cam surface 14 formed to have concave and convex portions thereon along a circumferential direction of the rear surface of the input disk 5a, and a plurality of rollers 16 serving as rolling elements which are sandwiched between the first cam surface 13 and the second cam surface 14 in a state being held by a retainer 15 so as to be freely rolled.

As shown in FIGS. 13A and 13B, the retainer 15 is formed by a metal plate of a circular annular shape and integrally provided with a plurality of, for example, four convex portions 18 at the outer peripheral portions thereof along the circumferential direction thereof with a constant interval therebetween. A pocket 17 for holding the roller 16 is provided at each of the convex portions 18. Each of the pockets 17 is formed in a rectangular shape and the width and length allowances or tolerances thereof are preferably to be a space sufficient not for restricting the roller 16. That is, since the roller is restricted when the space is small, the space between the roller and the pocket is preferably in a range of about 0.05 to 0.5 mm. The symmetrical degree, positional degree and angular allowance of the four pockets 17 are required to be managed strictly to some extent in a view point of adjusting the phase between the cam surfaces and the pockets.

The retainer 15 of the loading cam apparatus 2 is manufactured by the cutting process and the pockets 17 are subjected to the induction hardening process. However, since the yield of the material of the retainer is not good and the cutting process takes a long time, the cost of the loading cam apparatus becomes expensive.

Further, since the induction hardening process is performed by abutting a coil to the convex portion 18, if the coil is not set suitably, the coil may touch the convex portion and so there arises a problem that the convex portion may be cracked or broken when the external force is applied to the touched portion.

In the case of performing the induction hardening process, the inner diameter portion as well as the four pockets 17 are required to be subjected to the hardening process. Furthermore, in the case of performing the induction hardening process, it is difficult to perform the hardening process at the pockets in particular since recesses are formed at the four corner portions of each of the pockets 17. Thus, since each of the pockets receives the centrifugal force of the roller 16 at the outer side thereof while receiving a large face pressure at the side walls, the stress applied to the four corner portions thereof becomes large, so that the hardness of the four corner portions having been subjected to the hardening process is low and so there arises a problem that the breakage occurs from the corner portions.

Each of the pockets 17 is usually formed in a manner that each of the four corner portions is designed to have the single radius R of less than 1 mm, so that the stress is likely concentrated at the corner portions. Further, since the coupling portion between the corner portion and the linear portion of the pocket is formed to be sharp, a burr or flash is likely generated at the coupling portion and so there arises a problem that the roller is likely restricted by the coupling portion at the time of assembling.

SUMMARY OF THE INVENTION

Accordingly, the present invention has been performed in order to obviate the aforesaid problems of the prior art.

An object of the present invention is to provide a retainer for a loading cam apparatus which is low in a carbon concentration and can be fabricated easily by the pressing process and so cost thereof can be reduced.

Another object of the present invention is to provide a loading cam apparatus wherein a space is partially formed between the boss portion of a loading cam and the retainer so that lubricating oil flows through the space on the cam surface of an input disk thereby to improve the lubrication property.

A further object of the present invention is to provide a loading cam apparatus wherein each of the four corner portions of a pocket is arranged to form a recess of arc shape and a coupling portion between the corner portion and a linear portion of the pocket is formed to have an obtuse angle thereby to avoid the concentration of stress at the corner portions, and a burr is scarcely generated at the time of stamping out the pocket by the pressing process.

A still further object of the present invention is to provide a loading cam apparatus wherein a step portion is formed between the boss portion of a loading cam and the retainer so as to partially form a space therebetween so that the contact area between the boss portion and the retainer is made smaller thereby to smoothly slide the retainer.

In order to attain the aforesaid object, according to an aspect of the present invention, there is provided with a loading cam apparatus for a toroidal type continuously variable transmission, which includes:

a first cam surface formed to have concave and convex portions thereon along a circumferential direction thereof;

a second cam surface formed to have concave and convex portions thereon along a circumferential direction thereof and to oppose to the first cam surface along an axial direction thereof;

a plurality of rolling elements sandwiched between the first cam surface and the second cam surface; and a retainer for holding the plurality of rolling elements in a freely rotatable state, wherein the retainer includes, a retainer main body of a circular annular shape, and pockets provided at outer periphery portions of the retainer main body for holding the plurality of rolling elements, respectively, and wherein the retainer main body is formed by carbonitriding material of iron system with a carbon concentration in a range from 0.02 to 0.20 wt % both inclusive According to an example of the present invention, the retainer main body is formed by a pressing process.

According to an example of the present invention, each of the pockets includes recesses of arc shape respectively provided at four corner portions of the pocket, linear portions contacting to the rolling element, and coupling portions each for coupling corresponding one of the recesses and corresponding one of the linear portions, wherein each of the coupling portions is configured to have an obtuse angle larger than 90 degrees and smaller than 180 degrees where the obtuse angle is defined between a line extending along the one of said linear portions and a tangential line of the recess at an intersecting point between the corresponding one of said recesses and said corresponding one of said linear portions.

According to an example of the present invention, the first cam surface is formed on a loading cam, and wherein the retainer main body includes a guide portion fitted into the loading cam, outer diameter side projection portions provided at outer peripheral portions of the retainer main body to protrude on the second cam surface side, and inner diameter side projection portions provided at inner peripheral portions of the guide portion to protrude on the second cam surface side, wherein each of the inner diameter side projection portions is arranged to have a diameter larger than that of the guide portion thereby to form a step portion According to an example of the present invention, the first cam surface is formed on a loading cam, the loading cam has a boss portion, and wherein the retainer main body includes a guide portion fitted into the boss portion of the loading cam, and a step portion provided at an inner periphery end of the guide portion to partially form a space between the boss portion of the loading cam and the step portion.

According to an example of the present invention, the retainer is formed by a metal plate, each of the pockets is provided with a projection portion protruding on both sides of the metal plate at an inner end side thereof, and the projection portions are formed by subjecting the metal plate to plasticity processing and disposed along a space between the first cam surface and the second cam surface along a circumferential direction of the retainer.

According to another aspect of the present invention, there is provided with a loading cam apparatus for a toroidal type continuously variable transmission which is provided at an input shaft coupled to a driving source and transmits driving force to an input disk, the loading cam apparatus rotates in interlocked with a driving force transmission shaft which is provided at the input disk, the loading cam apparatus comprising:

a first cam surface engaged with the input shaft and formed to have concave and convex portions on one surface of a loading cam rotating together with the input shaft along a circumferential direction thereof;

a second cam surface formed to have concave and convex portions on a rear surface of the input disk along a circumferential direction thereof;

a plurality of rolling elements sandwiched between the first cam surface and the second cam surface; and a retainer for holding the plurality of rolling elements in a freely rotatable state, wherein the retainer includes, a retainer main body of a circular annular shape, and pockets provided at outer periphery portions of the retainer main body for holding the plurality of rolling elements, respectively, and wherein the retainer main body is formed by carbonitriding material of iron system with a carbon concentration in a range from 0.02 to 0.20 wt % both inclusive.

According to an example of the present invention, each of the pockets includes recesses of arc shape respectively provided at four corner portions of the pocket, linear portions contacting to the rolling element, and coupling portions each for coupling corresponding one of the recesses and corresponding one of the linear portions, wherein each of the coupling portions is configured to have an obtuse angle larger than 90 degrees and smaller than 180 degrees where the obtuse angle is defined between a line extending along the one of said linear portions and a tangential line of the recess at a intersecting point between the corresponding one of the recesses and the corresponding one of the linear portions.

According to an example of the present invention, the retainer main body includes a guide portion fitted into the loading cam, outer diameter side projection portions provided at outer peripheral portions of the retainer main body to protrude on the second cam surface side, and inner diameter side projection portions provided at inner peripheral portions of the guide portion to protrude on the second cam surface side, wherein each of the inner diameter side projection portions is arranged to have a diameter larger than that of the guide portion thereby to form a step portion According to an example of the present invention, the loading cam has a boss portion, and wherein the retainer main body includes a guide portion fitted into the boss portion of the loading cam, and a step portion provided at an inner periphery end of the guide portion to partially form a space between the boss portion of the loading cam and the step portion.

According to an example of the present invention, the retainer is formed by a metal plate, each of the pockets is provided with a projection portion protruding on both sides of the metal plate at an inner end side thereof, and the projection portions are formed by subjecting the metal plate to plasticity processing and disposed along a space between the first cam surface and the second cam surface along a circumferential direction of the retainer.

According to another aspect of the present invention, there is provided with a loading cam apparatus for a toroidal type continuously variable transmission which is provided at an input shaft coupled to a driving source and transmits driving force to an input disk, the loading cam apparatus rotates and is interlocked with a driving force transmission shaft which is provided at the input disk, the loading cam apparatus comprising:

a first cam surface engaged with the input shaft and formed to have concave and convex portions on one surface of a loading cam rotating together with the input shaft along a circumferential direction thereof;

a second cam surface formed to have concave and convex portions on a rear surface of the input disk along a circumferential direction thereof;

a plurality of rolling elements sandwiched between the first cam surface and the second cam surface; and a retainer for holding the plurality of rolling elements in a freely rotatable state, wherein the retainer includes, a retainer main body of a circular annular shape, and pockets provided at outer periphery portions of the retainer main body for holding the plurality of rolling elements, respectively, and wherein the retainer main body is formed by subjecting material of iron system with a carbon concentration in a range of 0.02 to 0.20 wt % or less to a pressing process and then subjecting the material thus pressed to a carbonitriding process.

As explained above, according to the present invention, since the retainer is made of soft material of iron system suitable for the pressing process, the pressing process can be performed easily. Further, since the entire surface of the retainer is carbonitrided, the hardness of the corner portions thereof at which the stress is concentrically applied can be increased advantageously.

According to the present invention, since the space is partially formed between the boss portion of the loading cam and the retainer due to the provision of the step portions, the lubricating oil flows through the space on the cam surfaces of the input disks thereby to improve the lubrication property of the retainer.

According to the present invention, since each of the four corner portions of the pocket is arranged to form the recess of arc shape and the coupling portion between the corner portion and the linear portion of the pocket is formed to have the obtuse angle, the concentration of stress at the corner portions can be avoided, and a burr is scarcely generated at the time of stamping out the pocket by the pressing process.

According to the present invention, since the step portion is formed between the boss portion of the loading cam and the retainer so as to partially form the space therebetween, the contact area between the boss portion and the retainer is made smaller thereby to smoothly slide the retainer.

According to the loading cam apparatus of the present invention, even if a first cam surface separates largely from a second cam surface, the retainer is held at the center portion between the both cam surfaces without deviating therefrom due to the presence of projection portions provided at both sides of the retainer so as to oppose to the both cam surfaces, respectively. Thus, rolling elements can be prevented from completely coming out of the pockets of the retainer and the corner portions of the pockets are prevented from contacting to the rolling contact surfaces of the rolling elements. Further, the deviation of the lubrication property between the rolling elements and the respective cam surfaces can be suppressed. Furthermore, even if a projection portion is provided at the rolling element, the rolling element can be housed at the inside of the pocket.

BRIEF DESCRIPTION OF THE DRAWINGS

FIGS. 2A to 2C are diagrams showing a retainer main body used in the first embodiment, wherein FIG. 2A is a longitudinal sectional side view of the retainer main body, FIG. 2B is a plan view of the retainer main body seem from an arrow A, and FIG. 2C is a plan view of the retainer main body seem from an arrow B;

FIGS. 13A and 13B are diagrams showing a retainer main body of a conventional loading cam apparatus, wherein FIG. 13A is a front view of the retainer main body and FIG. 13B is a longitudinal sectional side view of the retainer main body.

DETAILED DESCRIPTION OF THE PREFERRED EMBODIMENTS

Embodiments of the present invention will be explained with referenced to the accompanying drawings.

Figure 1:
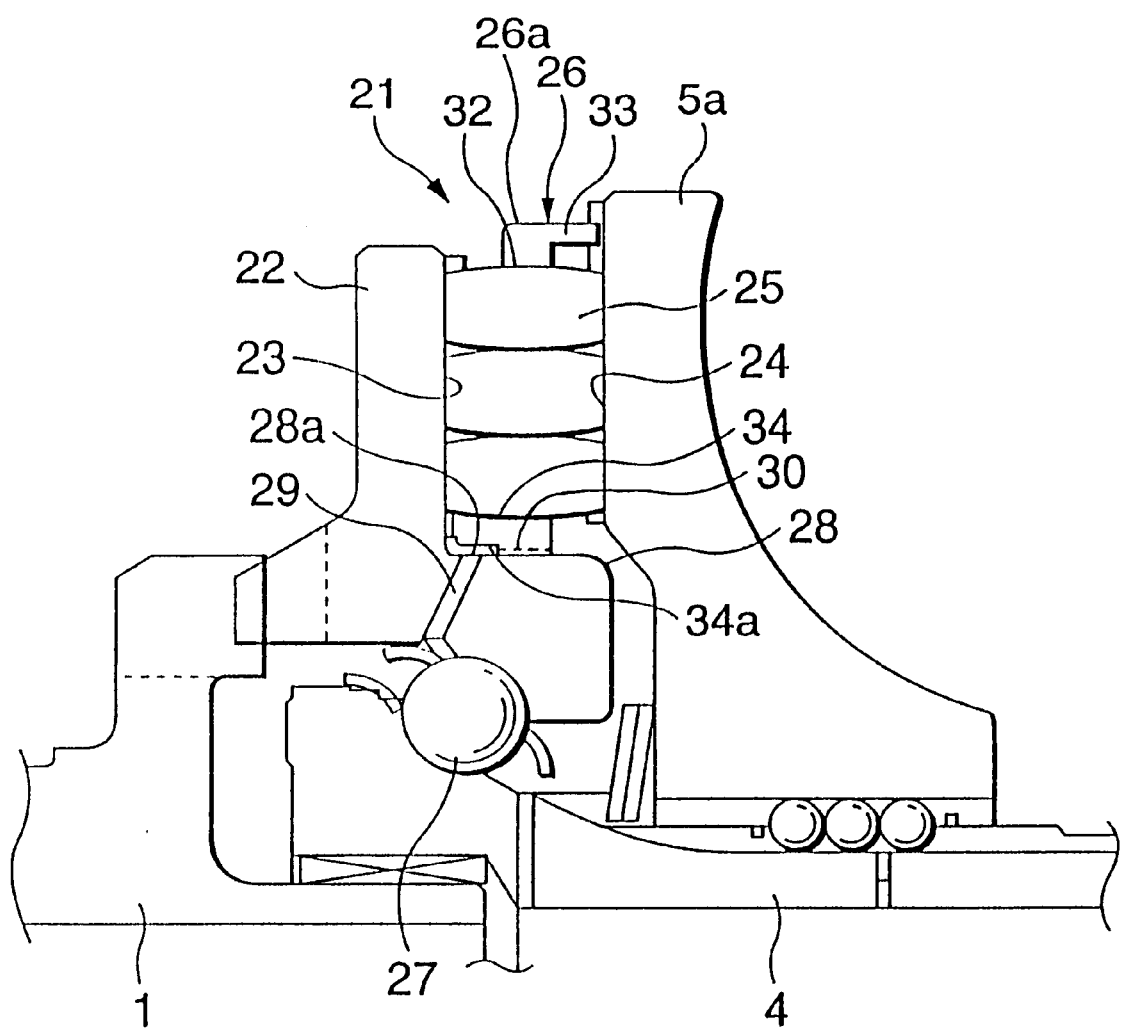
FIG. 1 is a longitudinal sectional side view showing a main portion of a toroidal type continuously variable transmission according to the first embodiment of the present invention.
Figure 2:
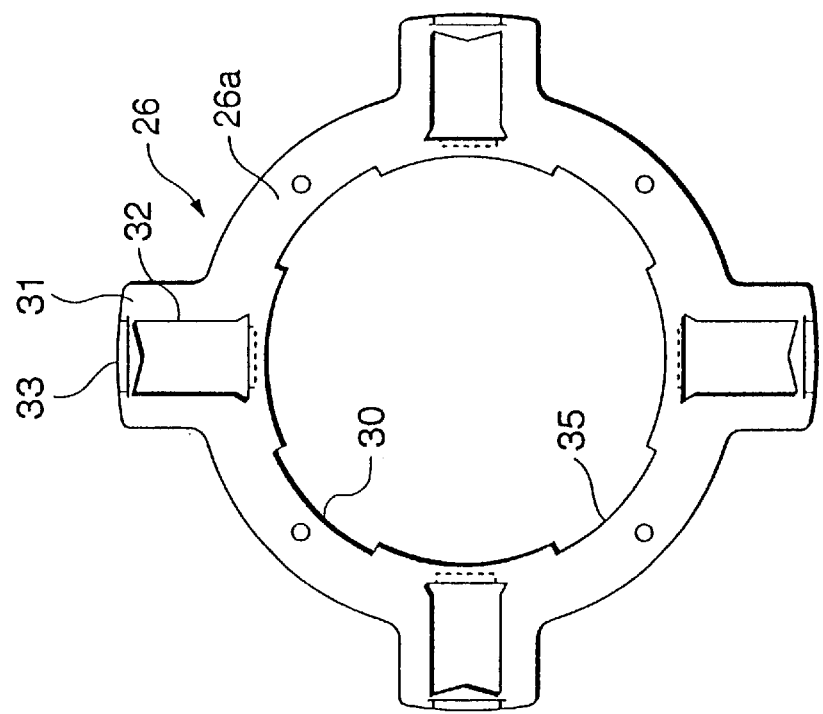
Figure 3:
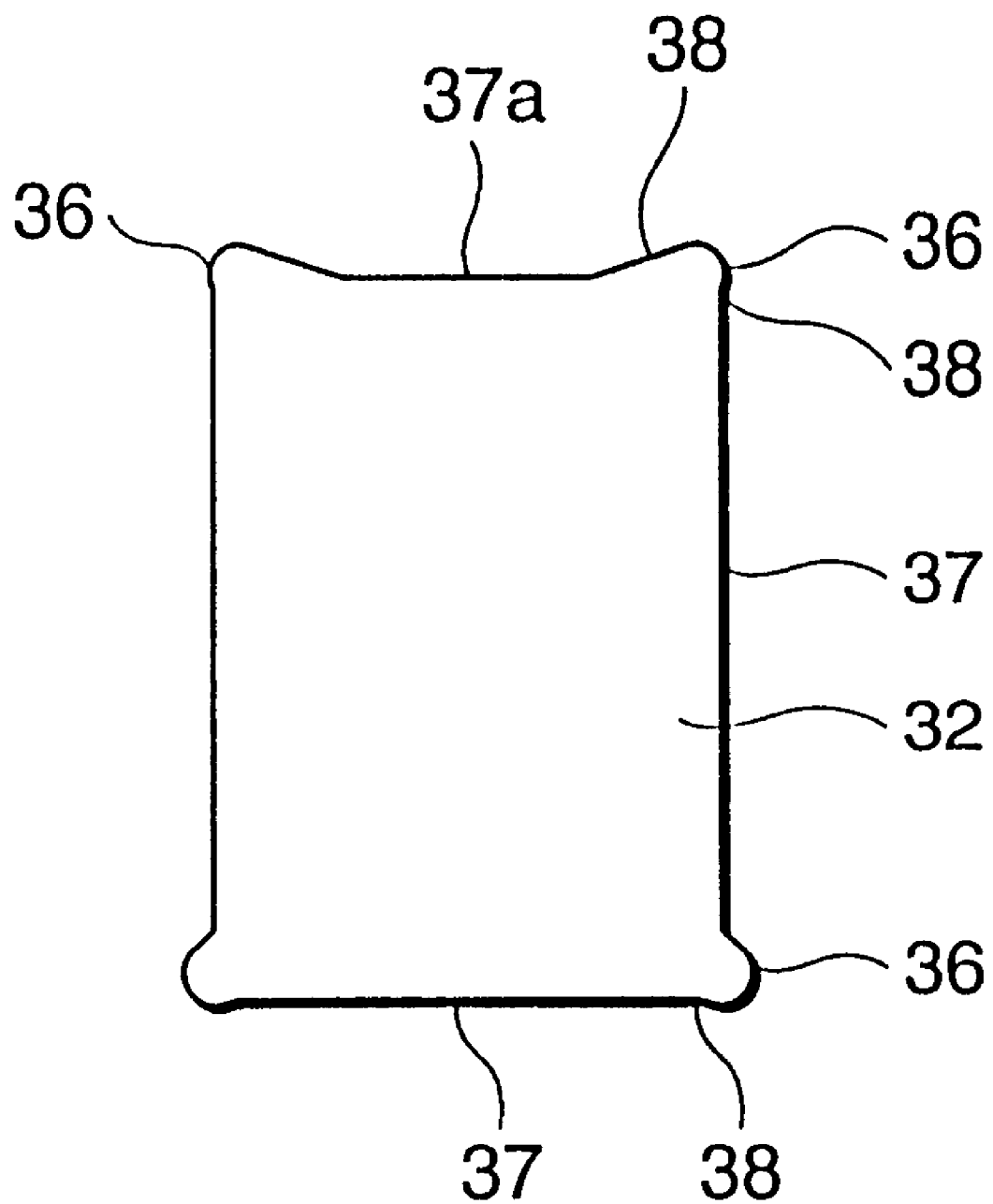
FIG. 3 is an enlarged view of a pocket used in the first embodiment.
Figure 4:
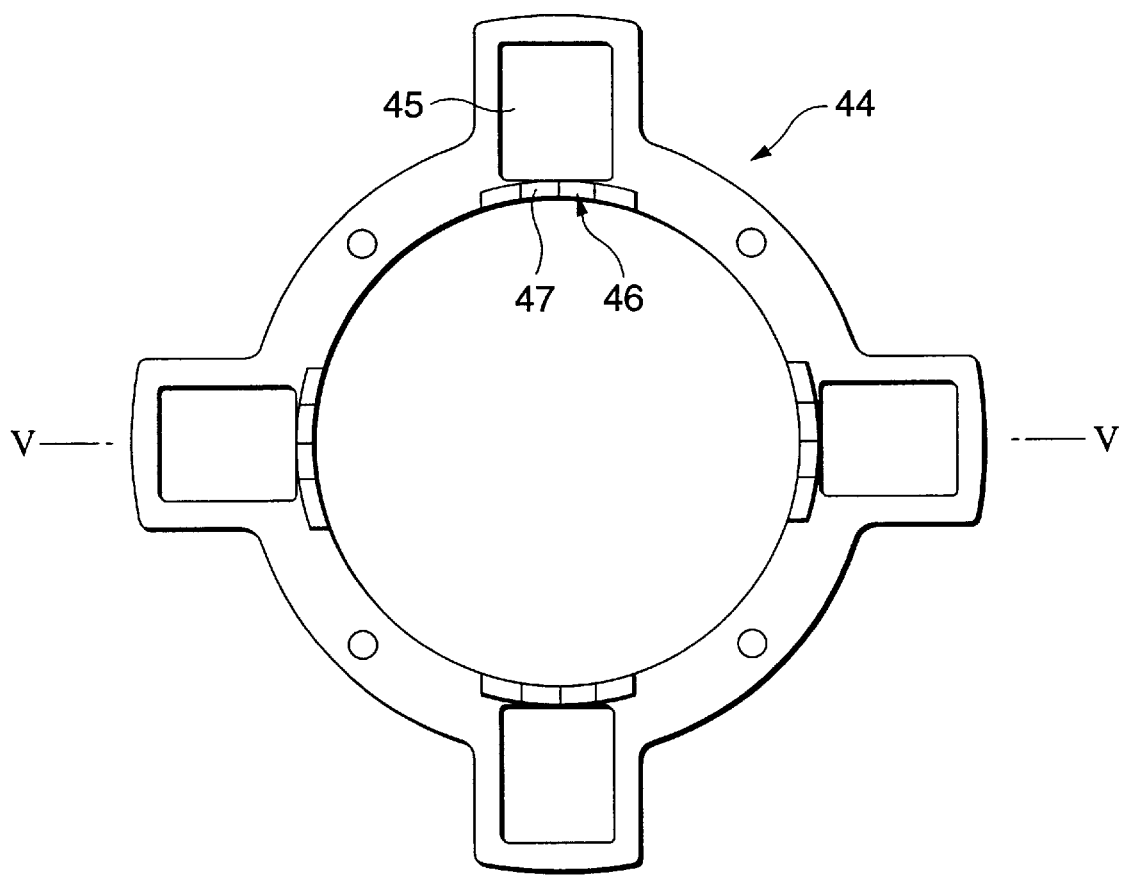
FIG. 4 is a plan view of the retainer used in the second embodiment.
Figure 5:
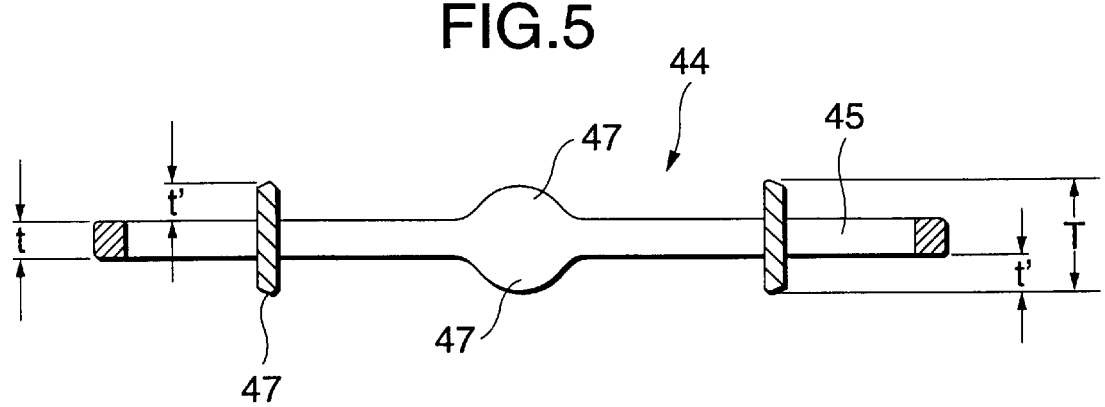
FIG. 5 is a sectional view of the retainer cut along a line V—V in FIG. 4.
Figure 6:
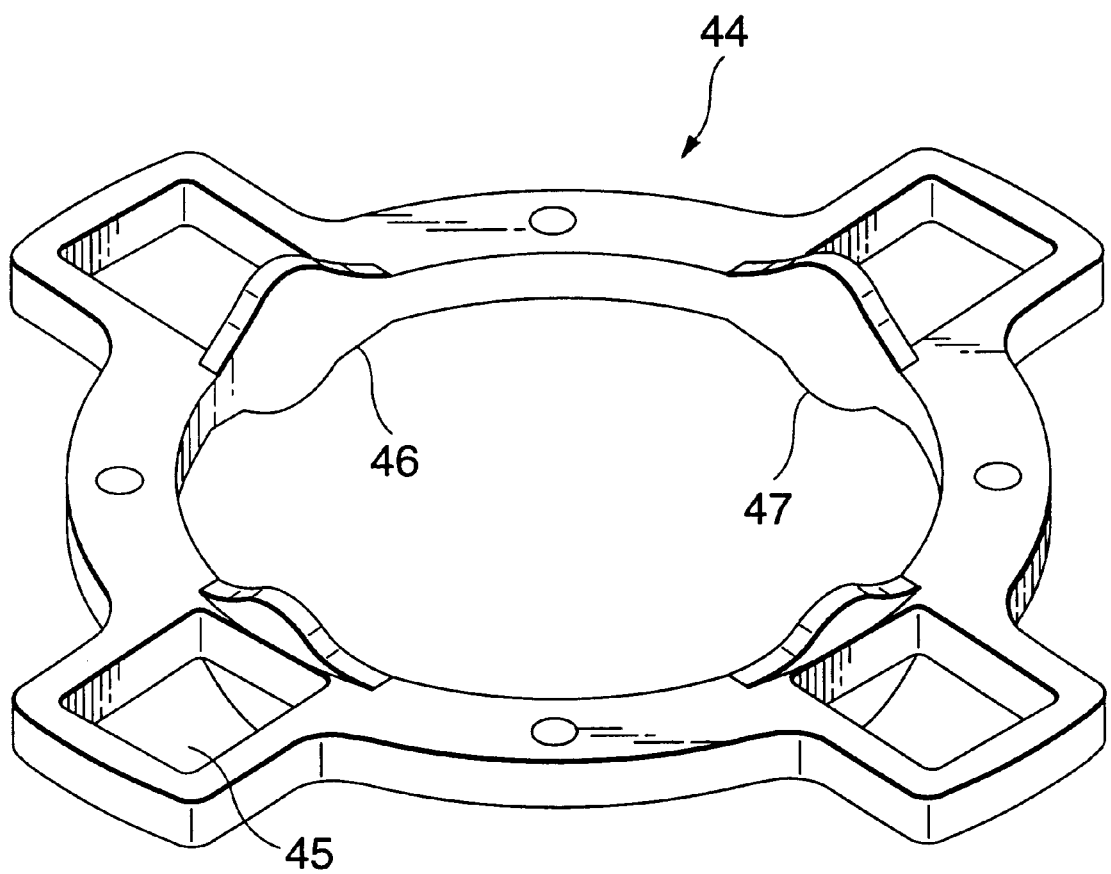
FIG. 6 is a perspective view of the retainer shown in FIG. 4.
Figure 7:
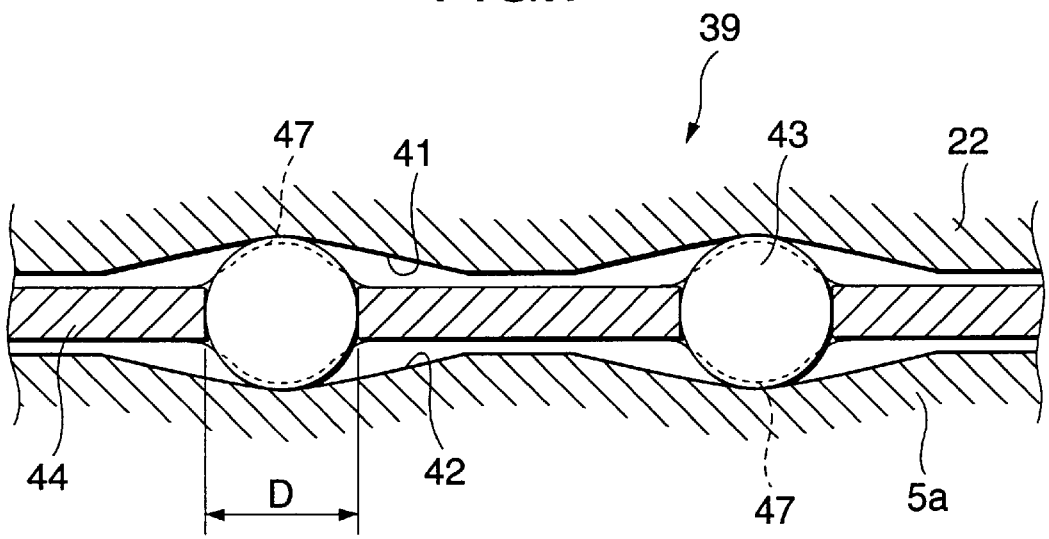
FIG. 7 is a sectional view of a part of the loading cam apparatus along the circumferential direction thereof showing the using state of the second embodiment.
Figure 8:
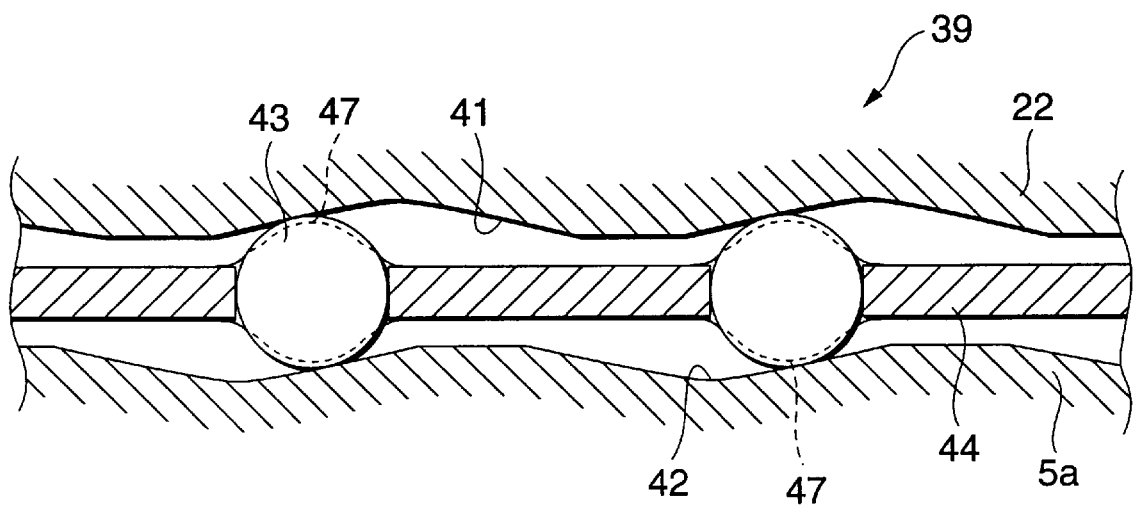
FIG. 8 is a sectional view of the part of the loading cam apparatus like FIG. 7 showing the operating state of the second embodiment.
Figure 13A:
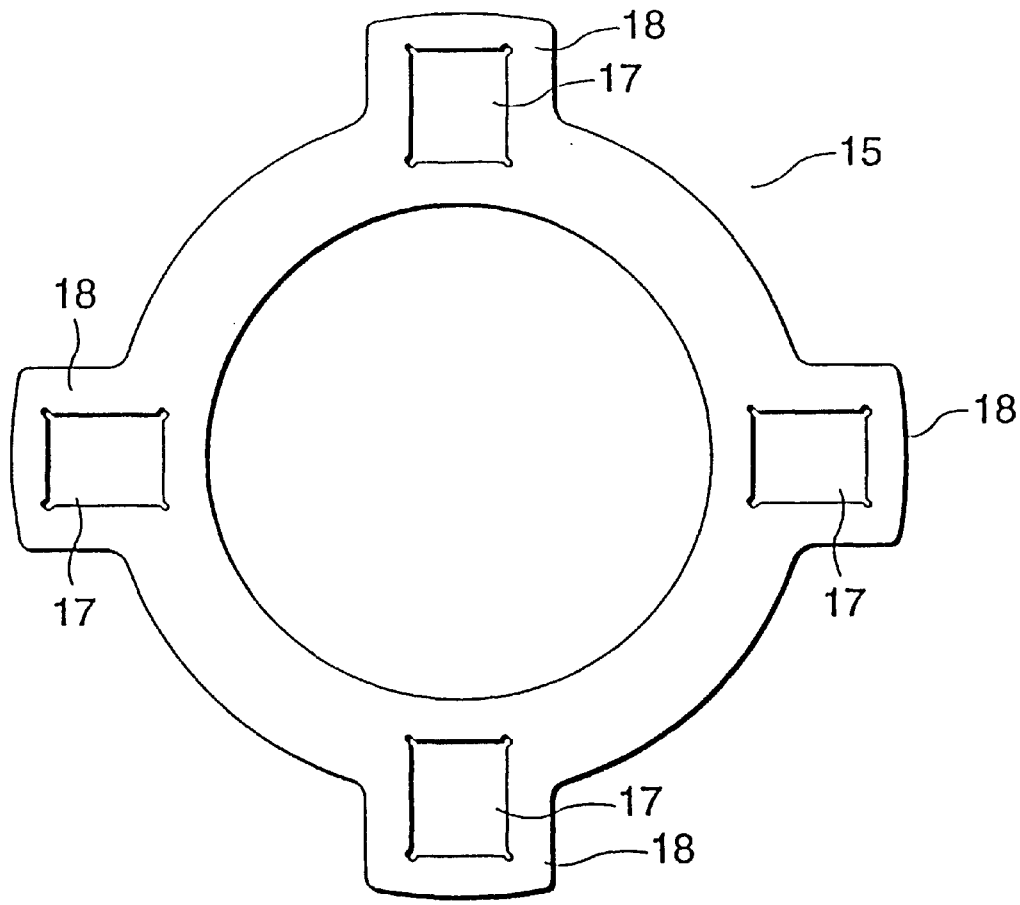
Figure 13B:
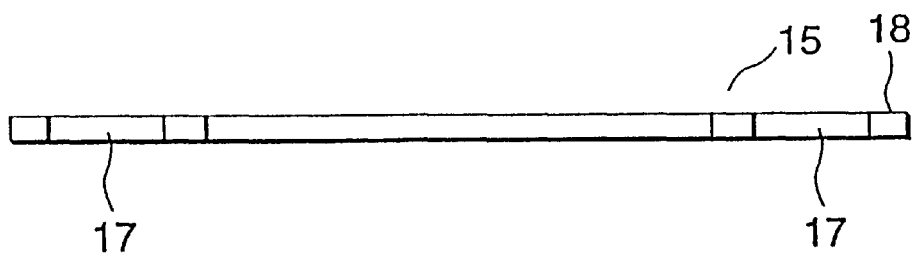
Figure 14:
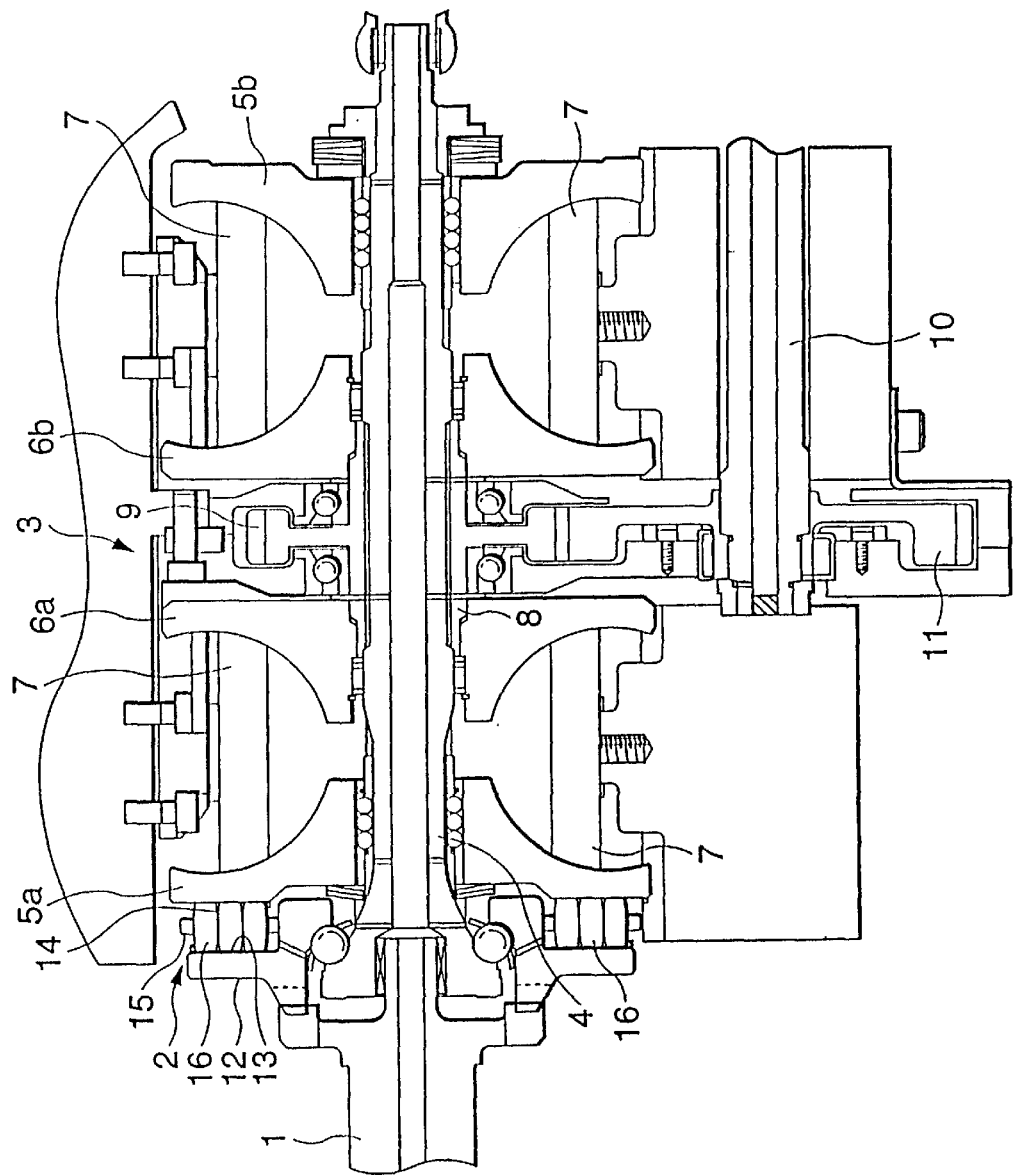
FIG. 14 is a longitudinal sectional side view showing a conventional toroidal type continuously variable transmission of a double cavity type.

FIGS. 1 to 3 show the loading cam apparatus according to a first embodiment of the present invention, in which the fundamental configuration of a toroidal type continuously variable transmission of a double cavity type of the embodiment is same as the conventional one and the portions identical to those of FIGS. 13 to 14 are referred to by the common symbols, with explanation thereof being omitted.

As shown in FIG. 1, a loading cam apparatus 21 is provided with a first cam surface 23 formed to have concave and convex portions thereon along a circumferential direction of one side surface of a loading cam 22 which engages with the input shaft 1 and rotates together with the input shaft 1, a second cam surface 24 formed to have concave and convex portions thereon along a circumferential direction of the rear surface of an input disk 5a, and a retainer 15 provided with a plurality of rollers 25 serving as rolling elements which are sandwiched between the first cam surface 23 and the second cam surface 24 so as to be freely rolled.

The loading cam 22 is supported so as to be freely rotatable by a driving force transmission shaft 4 through a ball bearing 27. A boss portion 28 is provided with a lubricating oil port 29 which communicates from the inner peripheral portion to the outer peripheral portion of the boss portion.

As shown in FIGS. 2A, 2B and 2C, a retainer main body 26a is formed by a metal plate of a circular annular shape and provided with a circular guide portion 30 which fits on the boss portion 28 of the loading cam 22. Further, the retainer main body 26a is integrally provided with a plurality of, for example, four convex portions 31 at the outer peripheral portion thereof along the circumferential direction thereof with a constant interval therebetween. A pocket 32 for holding the roller 25 is provided at each of the convex portions 31.

An outer diameter side projection portion 33 which protrudes on the input disk 5a side is provided at the outer periphery portion of each of the convex portions 31 of the retainer main body 26a. Inner diameter side projection portions 34 which protrude on the loading cam 22 side are provided at the inner periphery portions of the guide portion 30 in correspondence with the convex portions 31, respectively. Each of the inner diameter side projection portions 34 is arranged to have a diameter larger than that of the guide portion 30 so as to avoid or away from a step portion 28a of the boss portion 28 thereby to form a inner diameter step portion 34a.

In this manner, since the outer diameter side projection portion 33 which protrudes on the input disk 5a side is provided at the outer periphery portion of each of the convex portions 31 of the retainer main body 26a, the retainer 26 can be held at its most outer side (outer periphery), so that the retainer 26 can be prevented from failing. Further, since each of the inner diameter side projection portions 34 is provided with the inner diameter portion 34a, a space communicating with the lubricating oil port 29 can be formed between the step portion 28a of the boss portion 28 and the inner diameter step portion 34a of the inner diameter side projection portion 34, whereby the lubricating oil is likely collected temporarily at the space and so the lubrication property can be improved.

As clearly shown in FIG. 2A, step portions 35 formed by notches are provided at the inner periphery end of the guide portion 30 and at the portions between the adjacent inner diameter side projection portions 34. Due to the provision of the step portions 35, a space can be partially formed between the step portions 35 and the boss portion 28 of the loading cam 22. Accordingly, the lubricating oil flowing from the lubricating oil port 29 can also flow on the second cam surface 24 of the input disk 5a through the space. If the guide portion 30 of the retainer main body 26a does not slide smoothly with respect to the boss portion 28 of the loading cam 22, the driving force of the cam is lost largely. However, in this embodiment, since there are step portions 35 formed by the notches, the contact area between the boss portion and the retainer is made smaller, so that the retainer can be smoothly slid advantageously. Further, this embodiment is advantageous since there are few portions to be cut even if the retainer main body 26a is subjected to the finishing process by the cutting process after the pressing process.

As shown in FIG. 3, each of the pockets 32 is formed in a rectangular shape and provided with a recess 36 of arc shape with a radius R of 1 mm or more at each of the four corner portions of the pocket. Each of coupling portions 38 provided between the recesses 36 and liner portions 37, 37a to which the roller 25 contact is arranged to have an obtuse angle larger than 90 degrees and smaller than 180 degrees. Further, the linear portions 37a at the outer side of the pocket 32 is arranged preferably to have a length that is the same as that of the roller 25 and as small as possible.

Note that the obtuse angle is defined between a line extending along the linear portion 37, 37a and a tangential line of the recess 36 at an intersecting point between the recess 36 and the linear portion 37, 37a.

Since the recess 36 of arc shape with the radius R of 1 mm or more is provided at each of the four corner portions of each of the pockets 32 and each of the coupling portions 38 provided between the recesses 36 and the linear portions 37, 37a is arranged to have the obtuse angle, the concentration of stress at the corner portions can be avoided. Further, a burr is scarcely generated at the time of stamping out the pockets 32 by the pressing process.

The retainer main body 26a is made of soft material of iron system with a carbon concentration in a range from 0.02 to 0.20 wt % both inclusive suitable for the pressing process, for example, SCM420, SCr420, SS, SPHE, SPHC, SAPH or the like. The retainer main body 26a is formed by subjecting such material to the pressing operation and then the material thus pressed is subjected to the carbonitriding process.

The lower limit of the carbon concentration is set to be 0.02% by the following reasons. That is, if the normal SPCC with the carbon concentration of 0.02% or more or the steel with the carbon concentration less than 0.02% which is the lower limit of the general steel is employed, it is difficult to perform the refining or smelting process and the fabricating cost thereof becomes high. In contrast, the soft material with the carbon concentration of the upper limit of 0.20 wt % is suitable for the pressing process and is the upper limit in view of the operability of the pressing operation for adjusting the shape of the retainer main body 26a of the embodiment. Thus, in the case of employing such material selected in this manner, the pressing operation can be performed easily. Further, the hardness of the corner portions thereof at which the stress is concentrically applied can be advantageously increased in the case where the entire surface of the retainer is carbonitrided in this manner rather than the conventional case where the retainer is partially subjected to the induction hardening process. The retainer main body 26a preferably has the surface hardness of HRC55 or more and the effective hardening layer depth of 0.2 mm or more in order to hold the hard roller 25.

Since the retainer main body 26a is made of the soft material of the iron system with the carbon concentration in the range from 0.02 to 0.20 wt % both inclusive suitable for the pressing process, the productivity of the retainers using the pressing process can be improved and so the fabricating cost thereof can be reduced.

Although in the aforesaid embodiment, the explanation has been made as to the case where the present invention is applied to a toroidal type continuously variable transmission of a double cavity type, the present invention is not limited thereto, and of course the present invention can be applied to a toroidal type continuously variable transmission of a single cavity type.

FIGS. 4 to 8 show a loading cam apparatus 39 according to a second embodiment of the present invention. This embodiment is characterized in the configuration of a retainer so arranged that rollers 43 serving as rolling elements can be prevented from completely coming out of pockets 45 of a retainer 44 even if a first cam surface 41 separates largely from a second cam surface 42. Other arrangement of the loading cam apparatus of the embodiment is same as that of the aforementioned first embodiment, and so the explanation and illustrations thereof are omitted.

The retainer 44 constituting the loading cam apparatus of the embodiment is formed by a soft steel plate or a metal plate made of aluminum alloy or the like. The metal plate as the material of the retainer has a thickness t in a range of ¼ to ⅓ of the diameter D of the roller 43 as the rolling element to be held, that is, t=D/4 to D/3. The retainer 44 is formed substantially in a circular annular shape entirely by subjecting such a metal plate to the plasticity processing such that the rectangular pockets 45 are formed at plural portions (e.g., four portions in the embodiment) along the circumferential direction thereof. The retainer holds the rollers 43 serving as the rolling elements so as to be freely rotatable at the inside of the respective pockets 45.

A projection portion 47 protruding to the both sides of the metal plate (that is, major surface side and rear surface side in FIG. 4 and upper and lower sides in FIG. 5) is formed at each of plate portions 46 along almost the entire length thereof by subjecting such a metal plate to the plasticity processing, wherein the plate portions 46 each having arc shape are formed at plural portions (e.g., four portions in the embodiment) at the inner diameter side of the respective pockets 45. The projection amount t' of each of the projection portions 47 is set to be almost same as the thickness t of the metal plate, that is, t'=t. Thus, the entire thickness T of the retainer 44 which is a distance from the tip end to the other end of the projection portion 47 is sum of the thickness t of the metal plate and the twice of the projection amount t' as represented by the following expression (1).

$$T = t + 2t' \quad (1)$$

Such a retainer 44 is formed by the following first to fourth processes, wherein each of these processes is performed by the plasticity processing.

(1) First Process (Rough Stamping-out Process)

Figure 9:
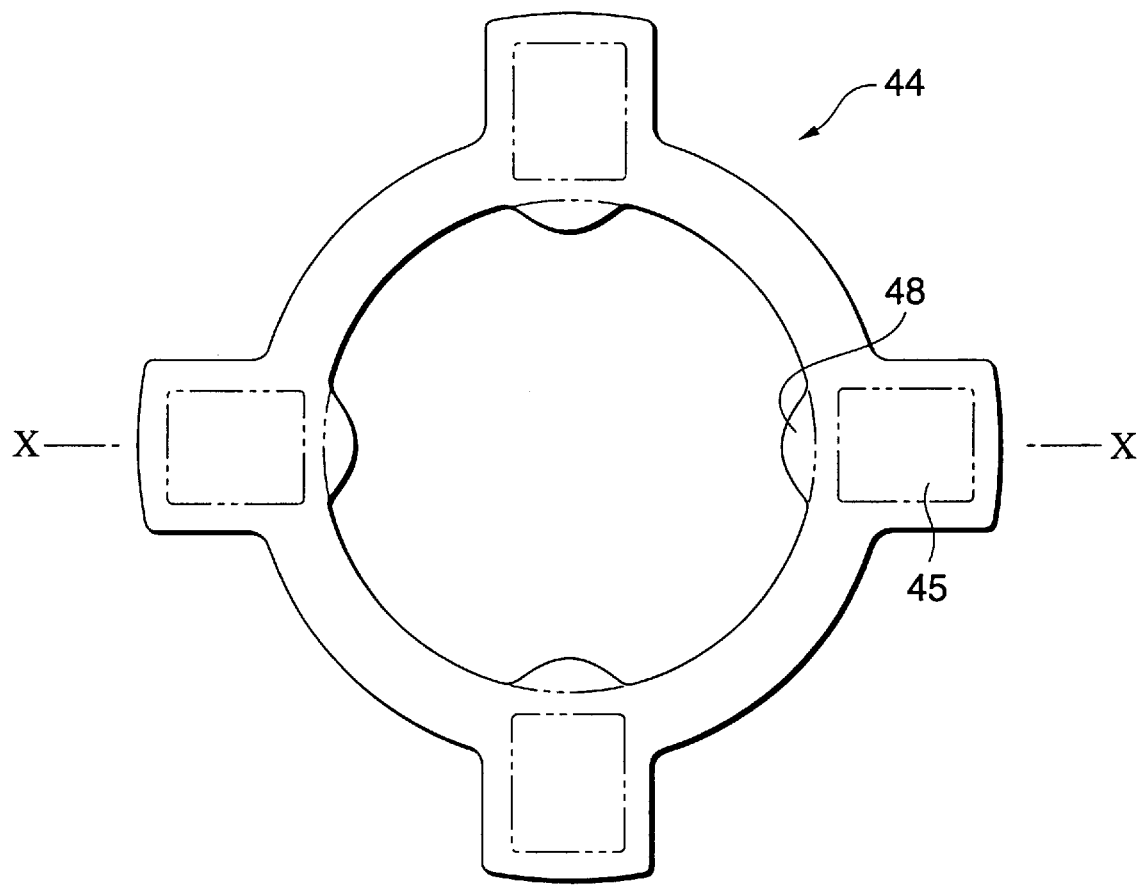
FIG. 9 is a plan view of a blank of the retainer used in the second embodiment.
Figure 10:
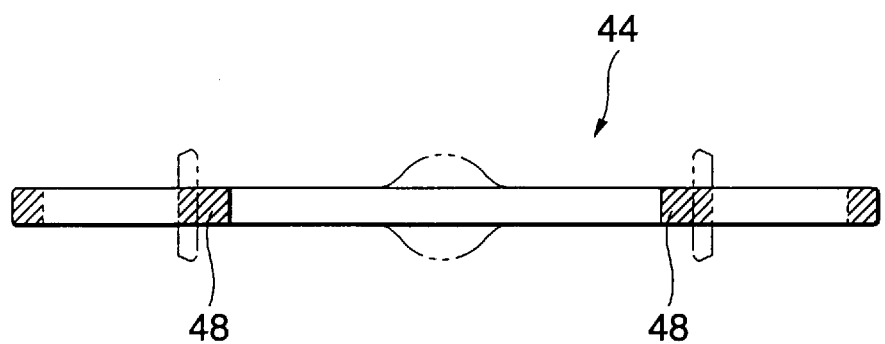
FIG. 10 is a sectional view of the blank of the retainer shown in FIG. 9 cut along a line X—X in FIG. 9.

FIGS. 9 and 10 show the work shape of the first process. In this first process, the metal plate as the material is subjected to the pressing process by placing the plate between male and female molds/dies thereby to form the retainer 44 of circular annular shape through the stamping-out or punching process. Although the sizes of the inner diameter and the outer diameter of the retainer 44 are adjusted to those of the retainer 44 having been completed, each of the four pockets 45 is configured to protrude to the inner side by an amount of volume corresponding to the projection portion 47. That is, each of the four pockets 45 is provided with an extended portion 48. In FIGS. 9 and 10, the configuration shown by a two dots-and-dashed line represents the outline of the retainer 44 having been completed.

(2) Second Process (Slit Rolling Process)

Figure 11:
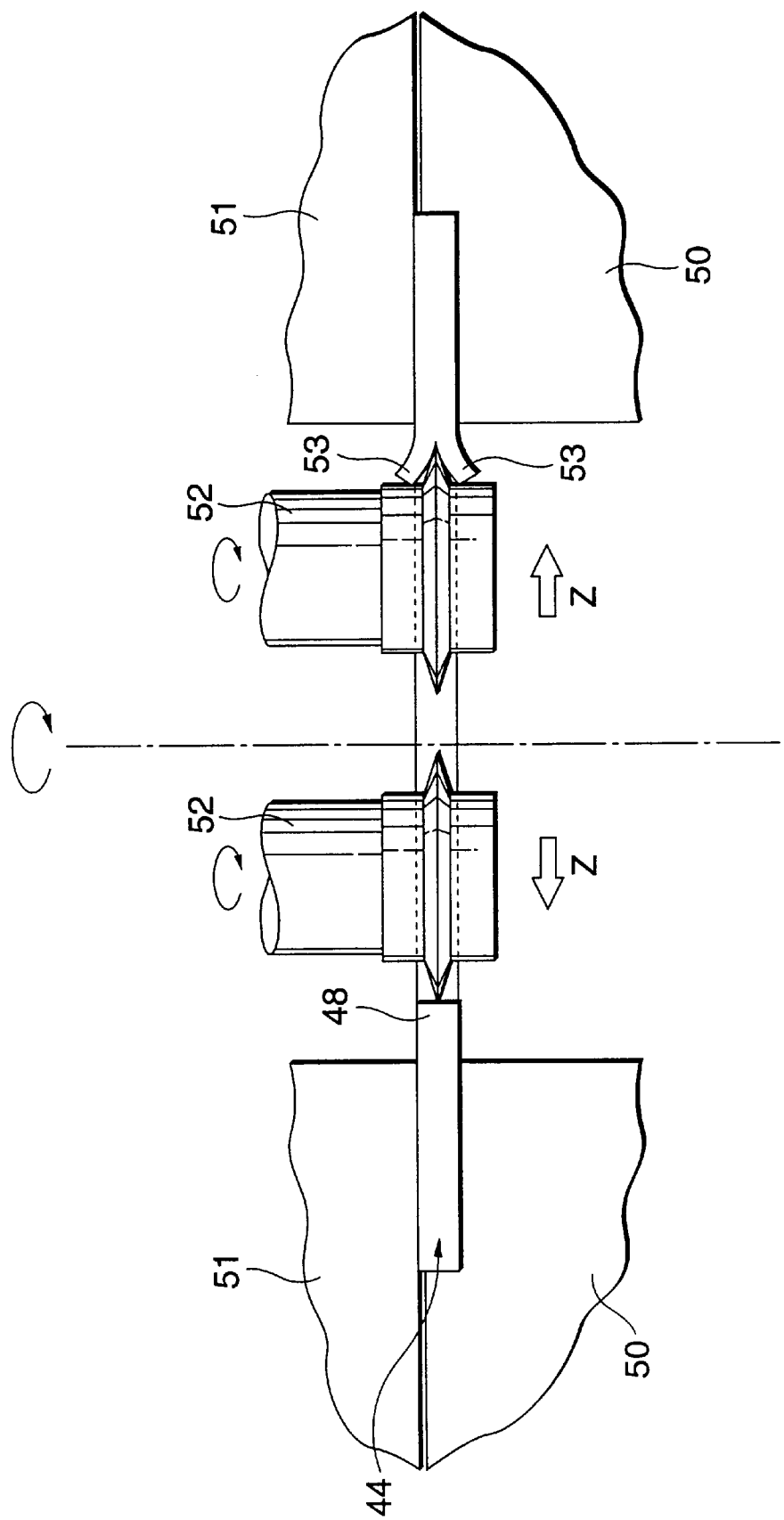
FIG. 11 is a diagram for explaining the principle of the slit rolling process for fabricating the retainer from the blank in the second embodiment.

FIG. 11 is a diagram showing the processing principle of the slit rolling process. In the figure, the left half represents a state before the forming and the right half represents a state after the forming. In this second process, by using a slit rolling roller 52 having projection portions with an acute angle along the circumferential peripheries of the forming portions, the portions corresponding to the projection portions 47 are formed by the slit rolling process at the four portions of the inner periphery of the retainer 44 having been stamped out in the first process. To be more concrete, the slit rolling roller 52 being rotated and disposed within the inner circular portion of the retainer 44 is pushed toward the outer side (direction shown by Z in the figure) of the retainer 44 while the retainer 44 having been stamped out in the first process is rotated in a state being sandwiched or held by work supporting plates 50, 51, whereby the tip ends of the extended portions 48 are cut and opened to be moved toward the both sides of the retainer 44 thereby to form extended pieces 53.

(3) Third Process (Flat Rolling Process)

Figure 12:
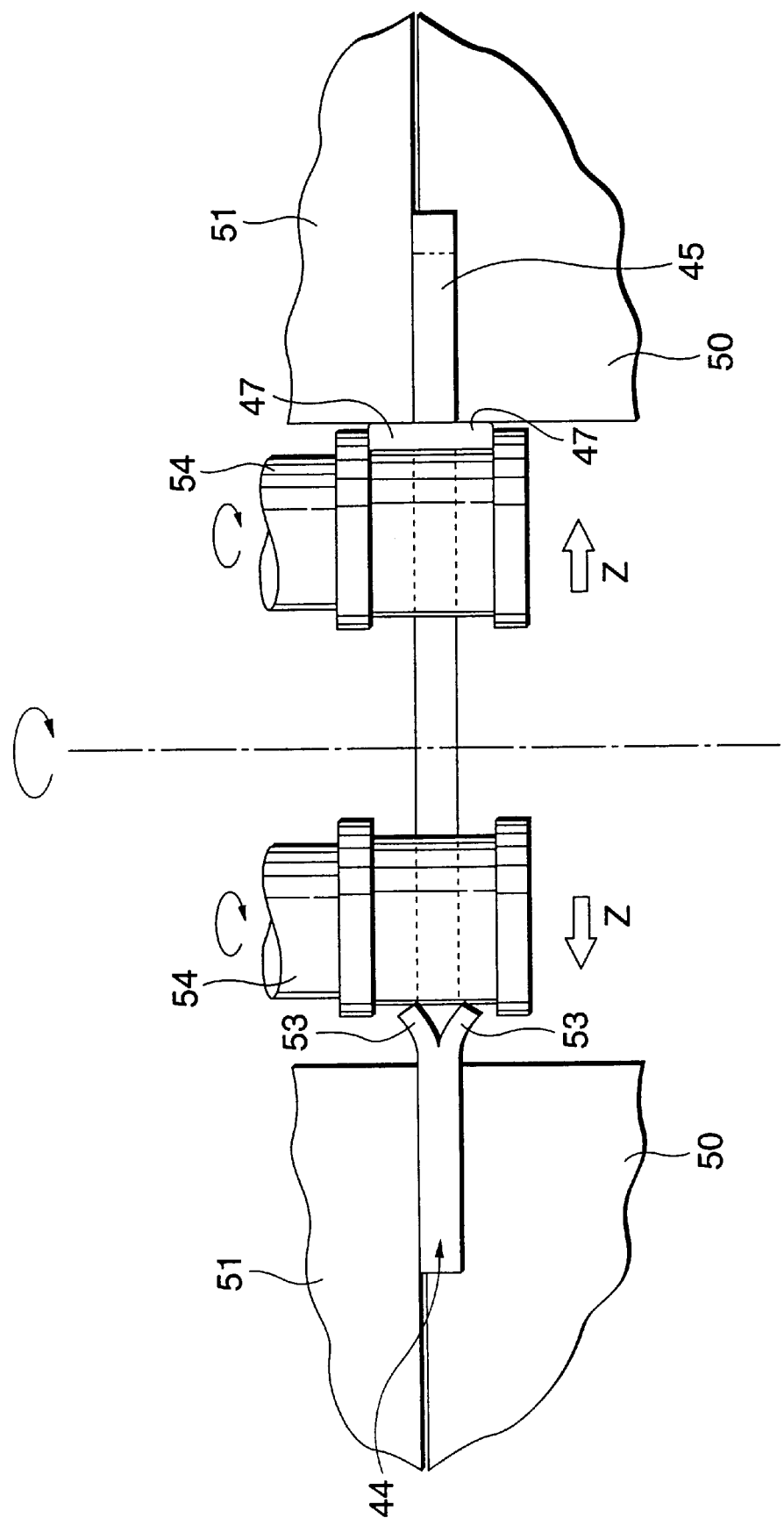
FIG. 12 is a diagram for explaining the principle of the flat rolling process for fabricating the retainer from the blank having been subjected to the slit rolling process in the second embodiment.

FIG. 12 is a diagram showing the processing principle of the flat rolling process. In the figure, the left half represents a state before the forming and the right half represents a state after the forming. In this third process, by using a flat rolling roller 54 having cylindrical processing surfaces along the circumferential peripheries of the forming portions, the projection portions 47 are formed by the flat rolling process at the four portions of the inner periphery of the retainer 44 having been subjected to the slit rolling process in the second process. To be more concrete, the flat rolling roller 54 being rotated and disposed within the inner circular portion of the retainer 44 is pushed toward the outer side (direction shown by Z in the figure) of the retainer 44 while the retainer 44 having been subjected to the slit rolling process in the second process is rotated like the second process in a state being sandwiched or held by the work supporting plates 50, 51, whereby the portions 53 are lifted toward the both sides of the retainer 44 to form the projection portions 47. In the figure, the configuration shown by a two dots-and-dashed line in the right half represents the pocket 45.

(4) Fourth Process (Pocket Stamping-out Process)

In the fourth process, the retainer 44 having been subjected to the flat rolling process in the third process is subjected to the stamping-out or punching process by using the press machine between another male and female molds/ dies and then subjected to the shaving process etc. to form the pockets 45. Thus, the inner size of each of the respective pockets 45 is finished to a predetermined value.

According to the loading cam apparatus of the present invention provided with the retainer 44 having been manufactured through the aforesaid first to fourth processes, even if the first cam surface 41 separates largely from the second cam surface 42, the retainer 44 can be held at the center portion between the both cam surfaces 41 and 42 without deviating therefrom at all due to the presence of projection portions 47 provided at both sides of the retainer so as to oppose to the both cam surfaces 41 and 42, respectively. To be more concrete, in the state where the retainer 44 is incorporated within the loading cam apparatus and the rollers 43 held by the pockets 45 of the retainer 44 are matched to the concave portions of the first and second cam surfaces 41 and 42, the tip ends of the projection portions 47 are opposed to the concave portions of the first and second .cam surfaces 41 and 42 on the respective surfaces of the retainer 44, respectively. Thus, although the retainer 44 is formed by the metal plate with the thickness of t, the retainer is restricted to the deviation to the axial direction (that is, the major and rear surface direction in FIG. 4 and the vertical direction in FIGS. 5, 7 and 8) as if the retainer is formed by the metal plate with the thickness of T (T=t+2t').

Accordingly, the rollers 43 are prevented from coming out of the pockets 45 of the retainer 44, and so the rolling surfaces 43a of the rollers 43 are prevented from contacting to the edge portions 45a of the pockets 45. Further, the unevenness of the lubricating oil between the rollers 43 and the first and second cam surfaces 41, 42 can be remarkably reduced. In particular, according to the loading cam apparatus of the present invention, the retainer 44 having the pockets 45 and the projection portions 47 can be formed only by the simple pressing processes and rolling processes performed by the first to fourth processes. Thus, the fabricating cost of the retainer 44 itself and the entire fabricating cost of the loading cam apparatus incorporating the retainer 44 can be reduced.

As clear from the aforesaid explanation, the retainer 44 can be restricted to the deviation to the axial direction by making the thickness t of the metal plate constituting the retainer 44 larger in place of forming the projection portions 47 of the present invention, so that the rollers 43 can be prevented from coming out of the pockets 45 of the retainer 44. However, in the case where the thickness t of the metal plate is made larger, a larger force is required to stamp out the pockets 45, so that it is required to use a large-sized press machine. As a result, the cost of the manufacturing equipment becomes expensive and the cost of the material becomes also expensive, so that the manufacturing cost of the apparatuses inevitably increases. Further, since the weight of the retainer 44 increases, not only the weight of the toroidal type continuously variable transmission merely increases but also the inertia moment thereof increases, which will be a cause for decreasing the rotation efficiency of the transmission. As a consequence, the entire transmission efficiency of the toroidal type continuously variable transmission is degraded. In contrast, since the present invention employs such a structure that the projection portions 47 are provided at both surfaces of a metal plate with a relatively small thickness, there does not arise the aforesaid problem as to the cost and the weight.

The gist of the present invention is not limited to the aforesaid embodiments. For example, the present invention can be applied to such a case where the balls element are modification of the rollers 43 and grooves for rolling such balls therein are formed on the first and second cam surfaces 41 and 42. In such a case, the loading cam apparatus can be operated in the similar manner as the aforesaid embodiments.

As explained above, according to the present invention, since the retainer is made of soft material of iron system suitable for the pressing process, the pressing process can be performed easily. Further, since the entire surface of the retainer is carbonitrided, the hardness of the corner portions thereof at which the stress is concentrically applied can be increased advantageously.

According to the present invention, since the space is partially formed between the boss portion of the loading cam and the retainer due to the provision of the step portions, such an advantage can be attained that the lubricating oil flows through the space on the cam surfaces of the input disks thereby to improve the lubrication property of the retainer.

According to the present invention, since each of the four corner portions of the pocket is arranged to form the recess of arc shape and the coupling portion between the corner portion and the linear portion of the pocket is formed to have the obtuse angle, such an advantage can be attained that the concentration of stress at the corner portions can be avoided, and a burr is scarcely generated at the time of stamping out the pocket by the pressing process.

According to the present invention, since the step portion is formed between the boss portion of the loading cam and the retainer so as to partially form the space therebetween, such an advantage can be attained that the contact area between the boss portion and the retainer is made smaller thereby to smoothly slide the retainer.

Since the loading cam apparatus of the present invention is configured and operated in the aforesaid manner, the defective operation of the apparatus caused by the coming-out of the rolling element from the pocket of the retainer can be surely prevented and so the operation of the toroidal type continuously variable transmission can be stabilized. Further, since the light-weight retainer can be obtained by the easy processing, such an advantage can be attained that the toroidal type continuously variable transmission with high efficiency can be fabricated at low cost.

While a description has been provided in connection with preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A loading cam apparatus for a toroidal continuously variable transmission, said loading cam apparatus comprising:

a first cam member having concave and convex portions thereon alternatively arranged along a circumferential direction thereof;

a second cam member, having concave and convex portions thereon alternatively arranged along a circumferential direction thereof and disposed opposite to said first cam member in an axial direction thereof;

a plurality of rolling elements interposed between said first cam member and said second cam member; and a retainer for holding said plurality of rolling elements in a freely rotatable state, wherein said retainer includes, a retainer main body of a circular annular shape, and pockets provided at outer periphery portions of said retainer main body for holding said plurality of rolling elements, respectively, and wherein said retainer main body is formed by carbonitriding material of iron system with a carbon concentration in a range of from 0.02 wt % to 0.20 wt % both inclusive, wherein said first cam member is formed on a loading cam, and wherein said retainer main body includes a guide portion fitted on said loading cam, outer diameter side projection portions provided at outer peripheral portions of said retainer main body to protrude on said second cam member side, and inner diameter side projection portions provided at inner peripheral portions of said guide portion to protrude on said first cam member side, wherein each of said inner diameter side projection portions is arranged to have a diameter larger than that of said guide portion thereby to form a step portion.

2. The loading cam apparatus for a toroidal continuously variable transmission according to claim 1, wherein said retainer is formed by a metal plate, each of said pockets is provided with a projection portion protruding on both sides of said metal plate at an inner end side thereof, and said projection portions are formed by subjecting said metal plate to plasticity processing and disposed along a space between said first cam surface and said second cam member along a circumferential direction of said retainer.

3. The loading cam apparatus for a toroidal continuously variable transmission according to claim 1, wherein said retainer main body is formed by a pressing process.

4. A loading cam apparatus for a toroidal continuously variable transmission, said loading cam apparatus comprising:

a first cam member having concave and convex portions thereon alternatively arranged along a circumferential direction thereof;

a second cam member having concave and convex portions thereon alternatively arranged along a circumferential direction thereof and disposed opposite to said first cam member in an axial direction thereof;

a plurality of rolling elements interposed between said first cam member and said second cam member; and a retainer for holding said plurality of rolling elements in a freely rotatable state, wherein said retainer includes, a retainer main body of a circular annular shape, and pockets provided at outer periphery portions of said retainer main body for holding said plurality of rolling elements, respectively, and wherein said retainer main body is formed by carbonitriding material of iron system with a carbon concentration in a range of from 0.02 wt % to 0.20 wt % both inclusive, wherein said first cam member is formed on a loading cam, said loading cam has a boss portion, and wherein said retainer main body includes, a guide portion fitted on said boss portion of said loading cam, said guide portion having an inner peripheral part provided with a plurality of inwardly projecting portions that project towards said loading cam, and a step portion provided at an inner periphery end of said guide portion for forming a space between said boss portion of said loading cam and said step portion, said step portion being located between adjacent inwardly projecting portions.

5. The loading cam apparatus for a toroidal continuously variable transmission according to claim 4, wherein said retainer main body is formed by a pressing process.

6. A loading cam apparatus for a toroidal continuously variable transmission which is provided at an input shaft coupled to a driving source and transmits driving force to an input disk, said loading cam apparatus rotates and is interlocked with a driving force transmission shaft which is provided at said input disk, said loading cam apparatus comprising:

a first cam member engaged with said input shaft and having concave and convex portions thereon alternatively arranged along a circumferential direction thereof;

a second cam member having concave and convex portions thereon alternatively arranged along a circumferential direction thereof and disposed opposite to said first cam member in .an axial direction thereof;

a plurality of rolling elements sandwiched between said first cam member and said second cam member; and a retainer for holding said plurality of rolling elements in a freely rotatable state, wherein said retainer includes, a retainer main body of a circular annular shape, and pockets provided at outer periphery portions of said retainer main body for holding said plurality of rolling elements, respectively, wherein said retainer main body is formed by carbonitriding material of iron system with a carbon concentration in a range from 0.02 to 0.20 wt % both inclusive, wherein said retainer main body includes a guide portion fitted on said loading cam, outer diameter side projection portions provided at outer peripheral portions of said retainer main body to protrude on said second cam member side, and inner diameter side projection portions provided at inner peripheral portions of said guide portion to protrude on said first cam member side, wherein each of said inner diameter side projection portions is arranged to have a diameter larger than that of said guide portion thereby to form a step portion.

7. The loading cam apparatus for a toroidal continuously variable transmission according to claim 6, wherein said retainer is formed by a metal plate, each of said pockets is provided with a projection portion protruding on both sides of said metal plate at an inner end side thereof, and said projection portions are formed by subjecting said metal plate to plasticity processing and disposed along a space between said first cam member and said second cam member along a circumferential direction of said retainer.

8. The loading cam apparatus for a toroidal continuously variable transmission according to claim 6, wherein said retainer main body is formed by a pressing process.

9. A loading cam apparatus for a toroidal continuously variable transmission which is provided at an input shaft coupled to a driving source and transmits driving force to an input disk, said loading cam apparatus rotates and is interlocked with a driving force transmission shaft which is pro-vided at said input disk, said loading cam apparatus comprising:

a first cam member provided on a loading cam that is engaged with said input shaft, said first cam member having concave and convex portions thereon alternatively arranged along a circumferential direction thereof;

a second cam member having concave and convex portions thereon alternatively arranged along a circumferential direction thereof and disposed opposite to said first cam member in an axial direction thereof;

a plurality of rolling elements sandwiched between said first cam member and said second cam member; and a retainer for holding said plurality of rolling elements in a freely rotatable state, wherein said retainer includes, a retainer main body of a circular annular shape, and pockets provided at outer periphery portions of said retainer main body for holding said plurality of rolling elements, respectively, wherein said retainer main body is formed by carbonitriding material of iron system with a carbon concentration in a range from 0.02 to 0.20 wt % both inclusive, wherein said loading cam has a boss portion, and wherein said retainer main body includes, a guide portion fitted on said boss portion of said loading cam, said guide portion having an inner peripheral part provided with a plurality of inwardly projecting portions that project towards said loading cam, and a step portion provided at an inner periphery end of said guide portion for forming a space between said boss portion of said loading cam and said step portion, said step portion being located between adjacent inwardly projecting portions.

10. The loading cam apparatus for a toroidal continuously variable transmission according to claim 9, wherein said retainer main body is formed by a pressing process.

* * * * *